(12) United States Patent
Cochran

(10) Patent No.: US 6,697,881 B2
(45) Date of Patent: Feb. 24, 2004

(54) METHOD AND SYSTEM FOR EFFICIENT FORMAT, READ, WRITE, AND INITIAL COPY PROCESSING INVOLVING SPARSE LOGICAL UNITS

(75) Inventor: Robert A. Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 09/870,312

(22) Filed: May 29, 2001

(65) Prior Publication Data

US 2003/0074492 A1 Apr. 17, 2003

(51) Int. Cl.[7] .............................................. G06F 13/14
(52) U.S. Cl. ........................... 710/5; 711/112; 711/114; 711/202; 382/236
(58) Field of Search ............................. 710/5; 711/202, 711/112, 114; 382/236

(56) References Cited

U.S. PATENT DOCUMENTS

| | | | | | |
|---|---|---|---|---|---|
| 4,555,802 A | * | 11/1985 | Fedak et al. | .................. | 382/56 |
| 5,509,089 A | * | 4/1996 | Ghoshal | ...................... | 382/236 |
| 5,870,535 A | * | 2/1999 | Duffin et al. | ................ | 395/115 |
| 6,532,527 B2 | * | 3/2003 | Selkirk et al. | ............... | 711/203 |
| 6,618,798 B1 | * | 9/2003 | Burton et al. | ............... | 711/202 |

* cited by examiner

Primary Examiner—Abdelmoniem Elamin

(57) ABSTRACT

A method and system for eliminating null I/O operations that transfer null data during processing of FORMAT and INITIAL-COPY I/O device commands and READ and WRITE I/O requests by an I/O device. Indications of whether or not a particular logical unit is sparsely populated with data are stored in the I/O device, along with bit maps indicating null tracks for sparse logical units. By referencing the stored indications and bit maps, the I/O device controller can recognize null operations that may be safely eliminated, saving processing and data transfer resources and eliminating time delays.

19 Claims, 7 Drawing Sheets

METHOD AND SYSTEM FOR EFFICIENT FORMAT, READ, WRITE, AND INITIAL COPY PROCESSING INVOLVING SPARSE LOGICAL UNITS

TECHNICAL FIELD

The present invention relates to data input/output requests and, in particular, to a method and system for increasing the efficiency of processing READ and WRITE input/ouput requests, formatting requests, and initial copy requests directed to logical units sparsely populated with data.

BACKGROUND OF THE INVENTION

The present invention relates to input/output ("I/O") requests and I/O device initialization requests carried out on sparse I/O devices, including sparse logical units provided by disk arrays. Therefore, a concise background of disk and disk-array technologies is provided below.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ request carried out by the storage device, data is returned via communications medium 102 to a remote computer, and as a result of a write request, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105, which stores I/O requests received from remote computers, and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations, in which data is stored onto, or retrieved from, the disk platters 104, is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The data contained in WRITE requests may also be stored first in cache memory 207, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes to tens or hundreds of terabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write requests directed to various objects stored on a LUN. I/O WRITE requests directed to object "$O_3$" are represented by arrow 306. When object-level mirroring is enabled, the disk array controller providing LUNs A and B automatically generates a second I/O write request from each I/O write request 306 directed to LUN A, and directs the second generated I/O write request via path 307, switch "$S_1$" 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write request, or any other type of I/O request that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_2$," and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write requests or other I/O operations that change the storage state of primary data object "$O_3$," are automatically reflected to the mirror object "$O_3$" 303.

A sparse LUN is a LUN that contains mostly null data. Null data is data comprising bytes having the numerical value "0". It is often the case that a system administrator or other computer user knows that a particular LUN will be initially sparse, or, in some cases, will remain sparse for an extended period of time. Sparse LUNs may arise due to assignment of certain types of data structures for storage on the LUNs, such as large sparse matrices employed in computational tasks, including Fourier transform analysis, finite element analysis, and image processing. Sparse LUNs may also result from allocation of a LUN to a database management system in one of various capacities, and even from specialized operating system use.

Although system administrators and system users may understand that a particular LUN will be employed as a sparse LUN, system administrators and users do not generally have a mechanism for designating a LUN provided by a disk array or other data storage device as a sparse LUN. Therefore, although the system administrators and users understand that many I/O requests directed to a sparse LUN may result in essentially empty, or null, operations, the disk array providing the LUN stores no indication that the LUN is sparse, and therefore carries out such null operations by needlessly physically transferring large blocks of null data values to and from disk drives on which the sparse LUN is physically contained or mirrored. Designers, manufacturers, and users of LUN-providing I/O devices, such as disk arrays, have therefore recognized the need for identifying sparse LUNs to I/O device controllers in order to increase I/O device efficiencies by forestalling needless physical transfers of large blocks of null values to and from physical media within local and remote I/O devices.

SUMMARY OF THE INVENTION

One embodiment of the present invention increases the I/O efficiency of an I/O device by storing within the I/O device indications that certain LUNs provided by the I/O device are sparse LUNs. For each sparse LUN, an additional bitmap is stored within shared memory associated with the I/O device to identify those tracks within the sparse LUN that contain only zero, or null, values. The controller for the I/O device, by accessing the stored indications identifying sparse LUNs and the bitmaps identifying null tracks within the sparse LUNs, may short-circuit certain null I/O operations, thereby avoiding transfer of tracks of null data to and from the physical medium on which sparse LUNs are stored. Significant efficiencies can be obtained by short-circuiting null READ and WRITE I/O operations and by deferring physical-media-level formatting of sparse LUNs.

DETAILED DESCRIPTION OF THE INVENTION

One embodiment of the present invention involves storing indications of sparse LUNs within shared memory associated with an I/O device, along with bitmaps for each sparse LUN indicating null tracks within the sparse LUN. Using the stored indications, an I/O device controller can avoid unnecessarily and wastefully transferring blocks of null data to and from physical media. Many I/O operations recognized as being null I/O operations can be immediately completed by the I/O device controller, without incurring time delays and processing overhead related to physical media access and data transfer. In a first overview section, below, the problems addressed by the present invention, and the techniques of the present invention, are discussed with reference to figures that illustrate the problems and techniques. In a following section, an implementation of techniques of the present invention is provided as modifications to a pseudocode model of a disk array controller.

Overview

A significant aspect of the present invention is the identification of particular I/O requests and I/O device commands during processing of which null I/O operations arise. Four different I/O requests and I/O device commands that spawn null I/O operations are described below, with reference to FIGS. 4–7. FIGS. 4–11 are high-level, abstract illustrations of I/O-device-command and I/O-request-processing provided to clearly illustrate, in FIGS. 4–7, the generation of null I/O operations, and, in FIGS. 8–11, the elimination of unnecessary processing and time delays associated with null I/O operations using the techniques of the present invention.

Figure 1:
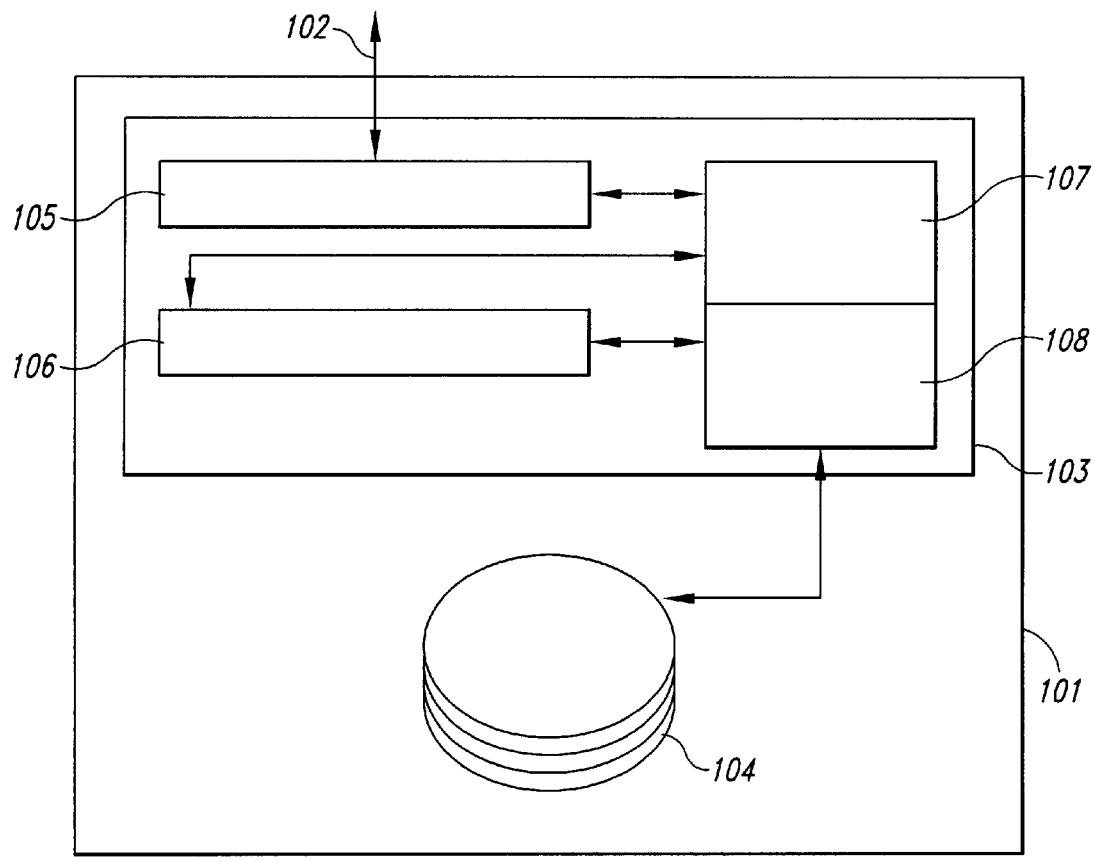
FIG. 1 is a block diagram of a standard disk drive.
Figure 2:
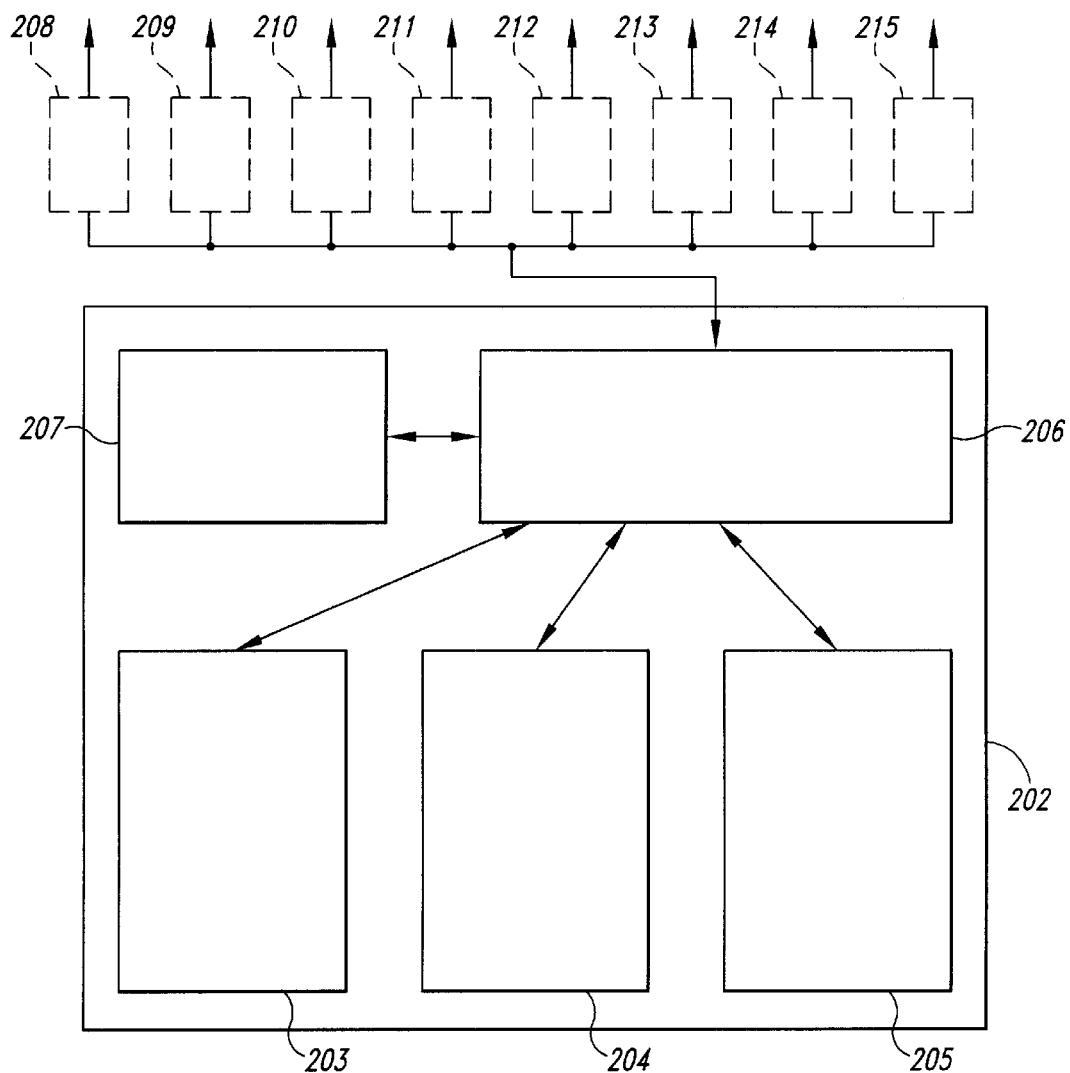
FIG. 2 is a simple block diagram of a disk array.
Figure 3:
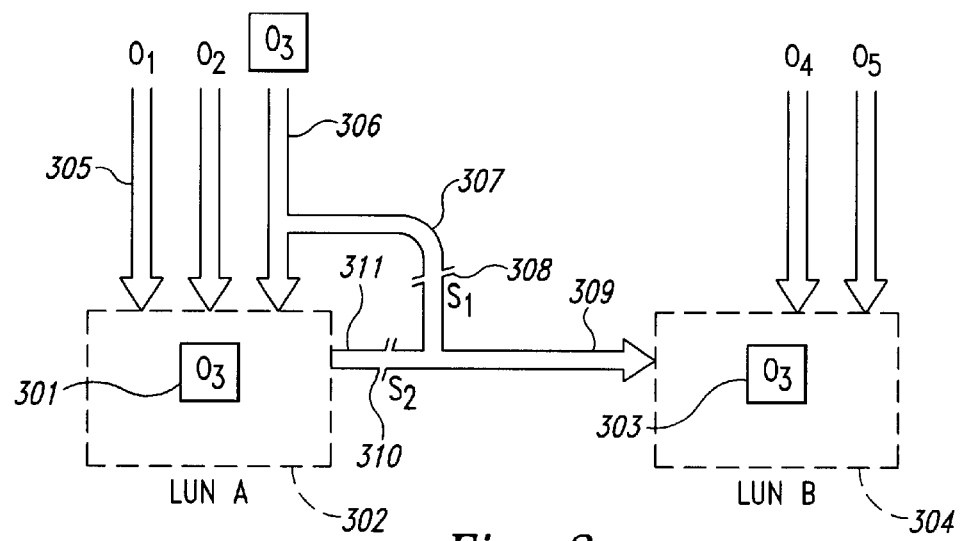
FIG. 3 illustrates object-level mirroring.
Figure 4:
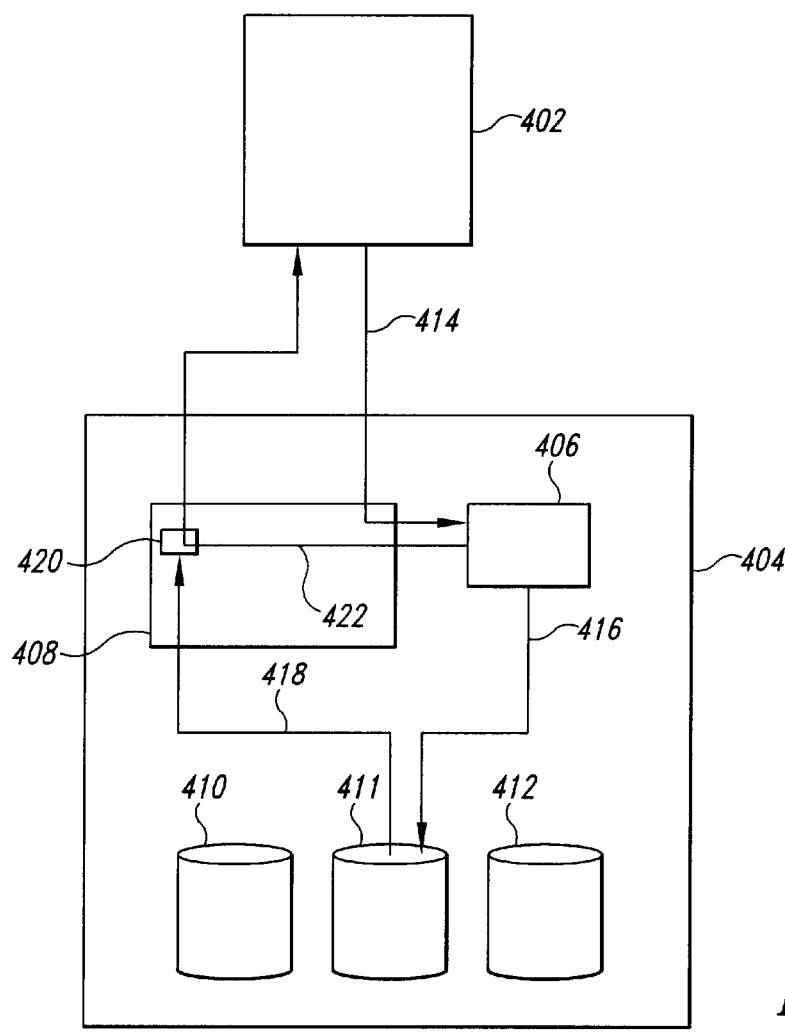
FIG. 4 illustrates a null READ I/O operation directed to a sparse LUN within a disk array.

FIG. 4 illustrates a null READ I/O operation within a disk array. In FIG. 4, and in FIGS. 5–11 that follow, a host computer 402 transmits I/O requests and I/O device commands to a disk array 404. The disk array 404 includes a disk array controller 406, internal memory 408, and three hard disk drives 410–412. Transmission of I/O requests, I/O device commands, and internal I/O operations within the disk array 404 are represented in FIGS. 4–11 using arrows, such as arrow 414. This convention is used throughout FIGS. 4–11.

In FIG. 4, the host computer 402 issues a READ I/O request 414 to the controller 406 of the disk array 404. The READ I/O request is directed to a LUN physically stored on an internal hard disk 411. The LUN is a sparse LUN, and the READ I/O request directs reading of a large block of zero data values from a null track of the sparse LUN. Because the disk array controller 406 has no stored indication that the LUN is sparse, the disk array controller, upon receiving the READ I/O request, directs a READ command 416 to the disk drive 411. The disk drive carries out a physical READ operation of a block of null data and writes 418 the block of null data to a cache buffer 420 in memory 408. The disk device 411 notifies the disk array controller (not shown in FIG. 4) of the completion of the READ I/O generation, upon receipt of which notification the disk array controller directs transfer 422 of the block of null data from the cache buffer 420 back to the host computer 402.

Figure 5:
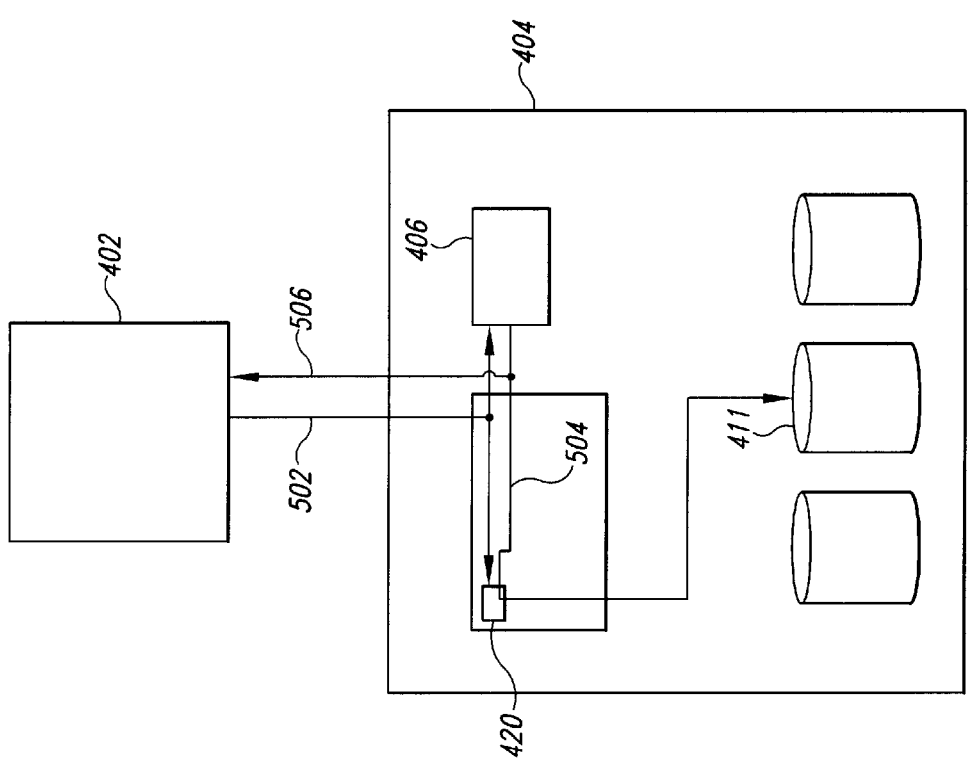
FIG. 5 illustrates a null WRITE I/O operation directed to a sparse LUN within a disk array.

FIG. 5 illustrates a null WRITE I/O operation directed to a sparse LUN within a disk array. In FIG. 5, a host computer 402 directs a WRITE I/O command to a sparse LUN physically stored on an internal disk drive 411. The WRITE I/O command 502 results in transfer of a block of null data to a cache buffer 420, carried out by communication components (not shown in FIG. 5) and the array controller 406. The disk array controller 406 then directs 504 an internal WRITE command to the disk drive 411, resulting in the disk drive reading the block of null data from the cache buffer 420 and writing the block of null data to physical media. The disk array controller 406 concurrently transmits a WRITE completion response 506 back to the host computer 402.

Figure 6:
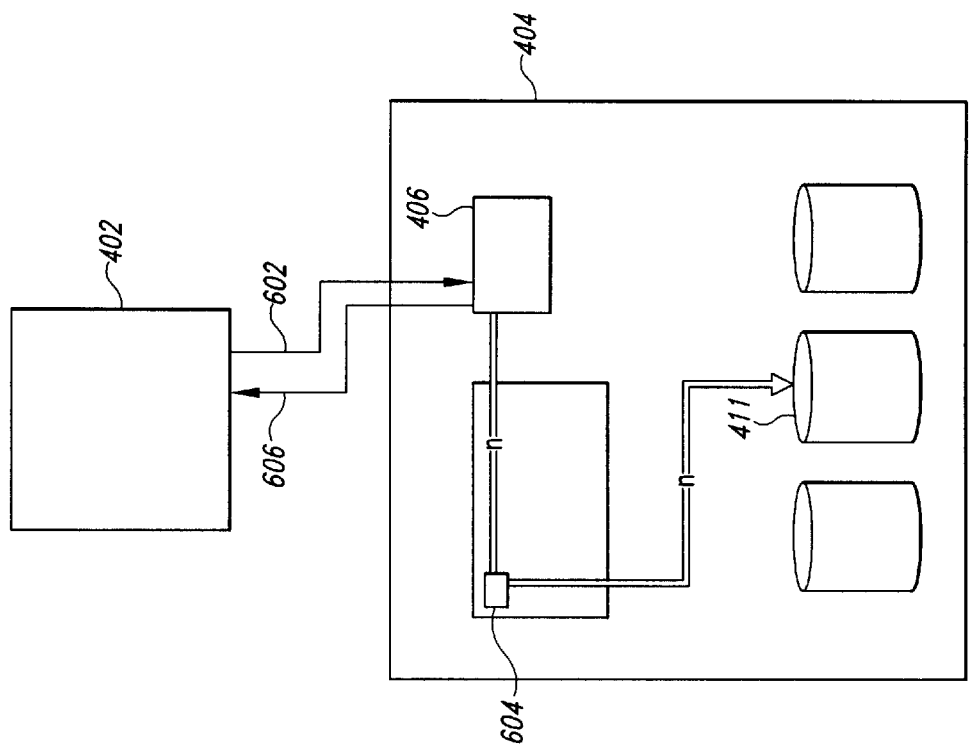
FIG. 6 illustrates formatting of a sparse LUN within a disk array.

FIG. 6 illustrates formatting of a sparse LUN within a disk array. In FIG. 6, a host computer 402 transmits 602 a FORMAT I/O device command to a disk array 404 directed to a sparse LUN, the data for which is stored on a disk drive 411 within the disk array 404. The disk array controller 406 receives the FORMAT I/O device command and proceeds to write a large number of blocks of null data from a memory buffer 604 to the disk drive 411. The disk drive 411 physically writes the blocks of null data values to physical media within the disk drive, returning a status message back to the disk array controller (not shown in FIG. 6) with successful completion of each WRITE I/O operation. Finally, when all blocks of null data have been written to the sparse LUN, the disk array controller 406 returns a FORMAT completion message 606 back to the host computer 402.

Figure 7:
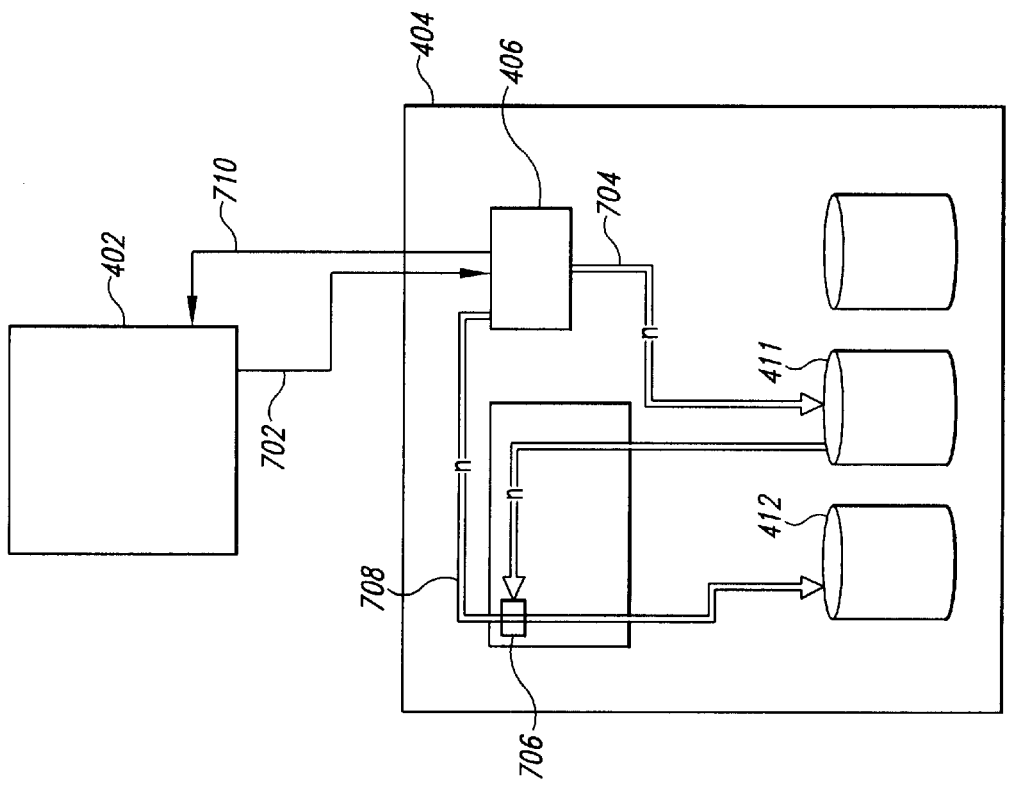
FIG. 7 illustrates an initial copy of a sparse LUN to form a mirror pair within a disk array.

FIG. 7 illustrates an initial copy of a sparse LUN to form a mirror pair within a disk array. In FIG. 7, a host computer 402 transmits 702 an INITIAL-COPY I/O device command to a disk array 404. The INITIAL-COPY I/O device command is directed to a target sparse LUN, causing data read from the target sparse LUN to be copied to a second copy LUN to form a mirror pair. Upon receiving the INITIAL-COPY I/O device command, the disk array controller 406 issues a large number of READ commands 704 to the hard disk drive 411 containing the data for the target sparse LUN. Upon completion of each READ command, that disk drive 411 writes the data read from physical media to cache buffers 706, and the disk array controller 406 then issues WRITE commands 708 to write the data read from the hard the disk drive 411 to a second, copy LUN stored on disk drive 412. Note that READ commands directed 704 to the hard disk drive 411 storing the target sparse LUN may generally alternate with WRITE commands 708 directed to the disk drive 412 containing the copy LUN. When the sparse LUN has been copied to the copy LUN, the disk array controller 406 returns an INITIAL-COPY completion message 710 back to the host computer 402. Because the LUN to which the INITIAL-COPY I/O device command is directed is a sparse LUN, the majority of the data read from the sparse LUN and copied to the copy LUN is null. Note that disk arrays encounter these same issues in a more painful way when the data is being sent over a long, slow link to a remote disk array.

FIGS. 8–11 illustrate elimination of certain null I/O commands within a disk array using the technique of the present invention in the four cases illustrated in FIGS. 4–7. The techniques of the present invention employ stored indications of sparse LUNs and, for each sparse LUN, a stored bitmap indicating which tracks of the sparse LUN contains only null data. In FIGS. 8–11, the stored indications and stored bitmaps are represented as a portion of semiconductor memory (802 in FIGS. 8–11).

Figure 8:
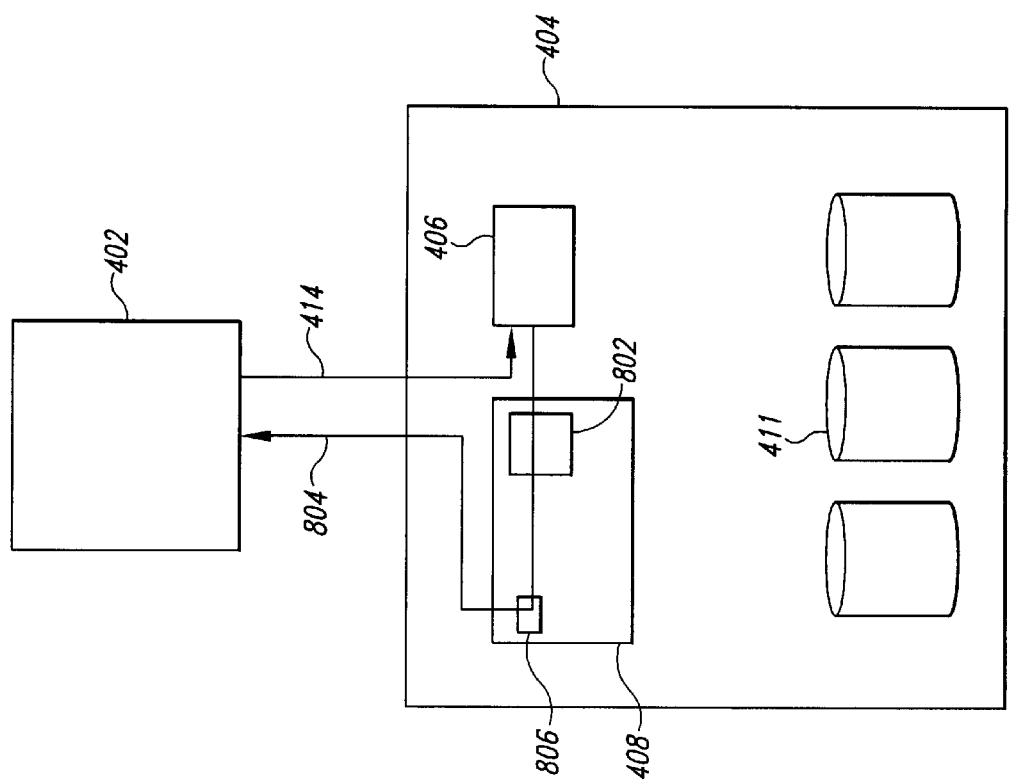
FIG. 8 illustrates short-circuiting of a null READ I/O command in a disk array employing the techniques of the present invention.

FIG. 8 illustrates short-circuiting of a null READ I/O command using the techniques of the present invention. In FIG. 8, as in FIG. 4, the host computer 402 issues 414 a READ I/O request to the disk array 404 directed to a sparse LUN. The disk array controller 406 accesses the stored indications 802 to determine that the LUN to which the READ I/O command is directed is sparse. Next, the disk array controller 406 accesses the bitmap corresponding to the sparse LUN to determine that the block of data requested to be read by the READ I/O command is contained within a null track, or, in other words, a track containing only zero data values, within the sparse LUN. Finally, the disk array controller 406 directs a communication component (not shown in FIG. 8) to return a block of null data 804 to the host computer 402. In the implementation illustrated in FIG. 8, a special block of zero data values 806 is stored within memory, and need not be repeatedly written for each null READ operation. In alternative implementations, the disk array controller 406 may direct a communications component to fill a communications packet with zero data values, avoiding transfer of zero data values from memory 408 to the communications component. Such techniques may also be applied to direct hard disk drive controllers to generate null data, rather than exchange null data with disk array memory buffers. In either implementation, as can be seen by comparing FIG. 8 to FIG. 4, internal transfer of an I/O READ command from the disk array controller 406 to the disk drive 411 on which the sparse LUN is stored, and reading of data from physical media within the disk drive, is avoided, saving processing cycles within the disk array controller and within the disk drive controller, internal communications bandwidth, memory transfers, and the significant latency associated with physical READ operations. In certain implementations, the hard disk drive itself may employ memory caching, so that only a portion of short-circuited null READ commands result in elimination of physical data reads, but, in all cases, processing overhead and data transfer overheads are eliminated.

Figure 9:
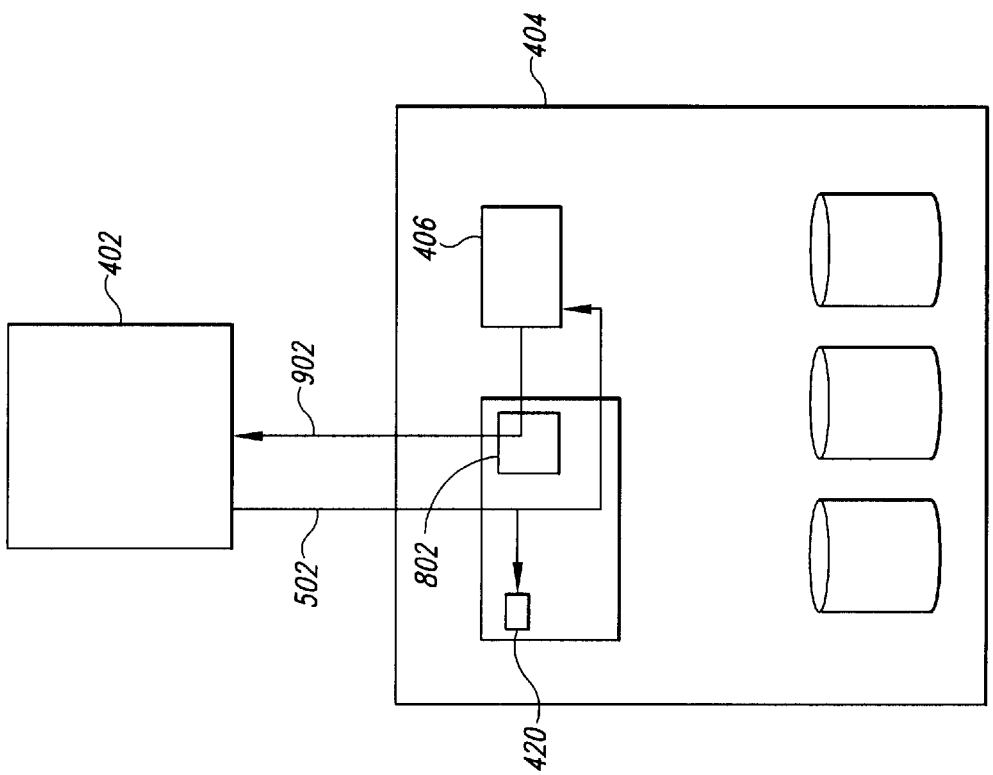
FIG. 9 shows short-circuiting of a null WRITE operation in a disk array employing techniques of the present invention.

FIG. 9 shows short-circuiting of a null WRITE operation in a disk array employing techniques of the present invention. FIG. 9 may be contrasted with FIG. 5 for a demonstration of the efficiencies provided by short-circuiting of the null WRITE I/O operation. In FIG. 9, as in FIG. 5, the host computer directs a WRITE I/O command to the disk array 404, resulting in transfer of a block of null data to a cache buffer. Upon receipt of the WRITE I/O command, the disk array controller 406 accesses the stored indications to determine that the LUN to which the null WRITE I/O command is directed is a sparse LUN. The disk array controller 406 then accesses the bitmap for the sparse LUN to determine that the track of the sparse LUN to which the data contained in the WRITE I/O command is directed is a null track. Finally, the disk array controller determines that the data transferred to the cache buffer 420 is a block of zero data values. The disk array controller then returns a WRITE-completeion message 902 to the host computer 402. No physical WRITE is necessary in this case, because a physical WRITE would write zero data values to physical media already containing zero data values.

Figure 10:
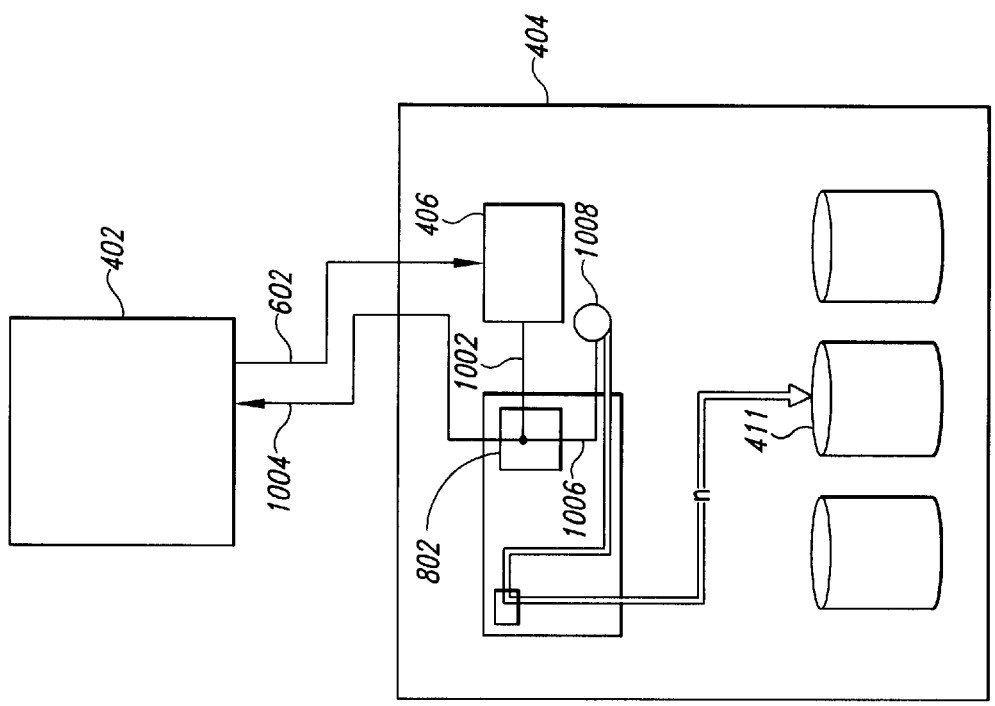
FIG. 10 illustrates formatting of a sparse LUN within a disk array employing techniques of the present invention.

FIG. 10 illustrates formatting of a sparse LUN within a disk array controller employing techniques of the present invention. FIG. 10 may be contrasted with FIG. 6 to illustrate the efficiencies achieved using techniques of the present invention. In FIG. 10, like in FIG. 6, the host computer 402 issues a FORMAT command directed to a sparse LUN provided by a disk array 404. When the disk array controller 406 receives the FORMAT I/O device command, the disk array controller accesses the stored indications 802 to determine that the LUN to which the FORMAT command is directed is a sparse LUN. In that case, the disk array controller 406 concurrently directs 1002 a FORMAT-completion message 1004 back to the host computer 402 and launches 1006 a low-priority, asynchronous task 1008 to direct null WRITE I/O operations to the disk drive 411 on which the sparse LUN is stored. Thus, although the same number of WRITE operations are directed to the disk drive 411 under the present invention as are directed to the disk drive 411 by a disk array controller lacking the present invention, illustrated in FIG. 6, the null WRITE operations may be deferred and carried out when otherwise unusable processing cycles are available within the disk array controller 404. Furthermore, the FORMAT-completion message can be immediately returned to the host computer rather than after physical formatting of the physical media on which the sparse LUN is stored. However, subsequent non-null WRITE operations directed to the sparse LUN must be coordinated with the deferred formatting so that the non-null WRITE operations are not subsequently overwritten by the asynchronous formatting process 1008.

Figure 11:
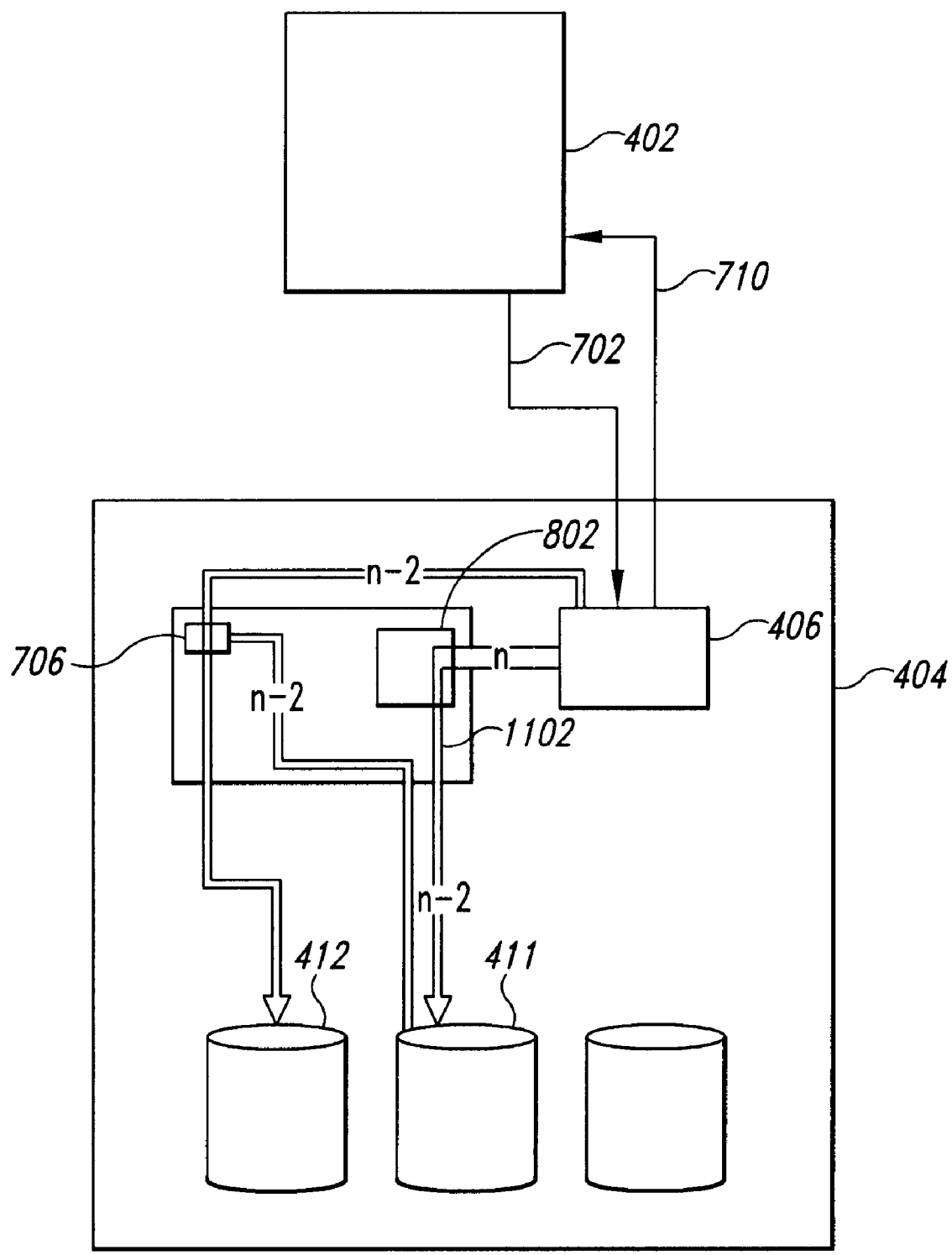
FIG. 11 illustrates an efficient initial copy of a sparse LUN within a disk array employing the techniques of the present invention to form a mirror pair.

FIG. 11 illustrates efficient initial copy of a sparse LUN within a disk array employing the techniques of the present invention. FIG. 11 may be contrasted with FIG. 7. In FIG. 11, the host computer 402 sends an INITIAL-COPY I/O device command 702 directed to a sparse target LUN within a disk array 404. Upon receiving the INITIAL-COPY I/O device command, the disk array controller 406 accesses the stored indications 802 to determine that the LUN to which the initial copy I/O device command is directed is a sparse LUN. The disk array controller 406 next accesses the bitmap for the sparse LUN to determine which of the tracks of the sparse LUN contain non-null data. Then, the disk array controller 406 directs READ operations 1102 only for non-null tracks to the disk drive 411 on which the sparse LUN is stored. Only the non-null tracks are physically read by the disk drive 411 and transferred to cache buffers 706, from which they are finally transferred to the copy LUN in disk drive 412. Thus, only non-null tracks are copied from the sparse target LUN to the copy LUN, eliminating a large number of unnecessary internal null WRITE and null READ commands. The disk array controller 406 can thus more quickly return an initial copy complete message 710 back to the host computer 402.

An Embodiment Illustrated By Modifications of a Pseudocode Implementation

A C++-like pseudocode model of a disk array controller is provided, below, in order to illustrate an implementation of one embodiment of the present invention. The pseudocode implementation provides detailed implementation of only a few member functions critical for illustration of the present invention, and omits implementation details and aspects of a disk array controller unrelated to the present invention. For example, the implementations of many member functions are not provided, and specific values for constants are not included. All such details are beyond the scope of the present invention, and are, additionally, easily implemented by skilled disk array controller designers.

The pseudocode implementation first includes a type definition, several constants, and several enumerations:

```
1   typedef unsigned char BYTE;
2   const int numHDDs;
3   const int numLUNs;
4   const int thisArray;
5   enum rType {READ, WRITE, FORMAT, FORMAT_WRITE, INIT_COPY,
6                  INIT_COPY_READ, INIT_COPY_WRITE};
7   enum aType {INTERNAL, EXTERNAL};
```

The type definition "BYTE" refers to a single byte of memory. The constant "numHDDs" is the maximum number of disk drives within the disk array. The constant "num-LUNs" is the maximum number of LUNs that may be provided by the disk array. The constant "thisArray" is an identifier for the disk array. The enumeration declared on lines 5 and 6, above, includes types of various I/O requests and I/O device commands carried out by the disk array controller in the pseudocode model. Finally, the enumeration "aType," declared on line 7, is used to differentiate internal and external disk addresses.

Declarations for the classes "diskAddress," "externalDiskAddress," and "internalDiskAddress" are provided below:

```
1   class diskAddress
2   {
3       private:
4           int diskArray;
5           int track;
6           int sector;
7       public:
8           void setDiskArray(int a);
9           void setTrack(int trk);
10          void setSector(int sct);
11          int getDiskArray();
12          int getTrack();
13          int getSector();
14          virtual aType getType() = 0;
15          diskAddress(int a, int t, int s);
16          diskAddress();
17  };
1   class externalDiskAddress: public diskAddress
2   {
3       private:
4           int LUN;
5       public:
6           void setLUN(int In);
7           int getLUN();
8           aType getType();
9           externalDiskAddress(int a, int t, int s, int l);
10          externalDiskAddress();
11  };
1   class internalDiskAddress: public diskAddress
2   {
3       private:
4           int HDD;
5           int side;
6       public:
7           void setHDD(int hd);
8           void setSide(int sd);
9           int getHDD();
10          int getSide();
11          aType getType();
12          internalDiskAddress (int a, int t, int s, int H, int sd);
13          internalDiskAddress ();
14  };
```

The classes "externalDiskAddress" and "internalDiskAddress" both derive from the class "diskAddress." An externalDiskAddress is described by a disk array identifier, a LUN, a track, and a sector. An internalDiskAddress is described by a disk array identifier, a hard disk drive identifier, a side within the hard disk drive, a track, and a sector. The external disk address and internal disk address classes provide methods for retrieving and storing the above-described components of external disk addresses and internal disk addresses.

The class "request," which represents an I/O request, internal I/O operation, or I/O device command, is provided below:

```
1   class request
2   {
3       public:
4           void setType(rType t);
5           void setFrom(externalDiskAddress* dA);
6           void setTo(externalDiskAddress* dA);
7           void setInternalAdd(internalDiskAddress* dA);
8           void setLength(int In);
9           void setID(int i);
10          void setBuffer(BYTE* b);
11          rType getType();
12          externalDiskAddress* getFrom();
13          externalDiskAddress* getTo();
14          internalDiskAddress* getInternalAdd();
15          int getLength();
16          int getID();
17          BYTE* getBuffer();
18          request();
19          request (rType rt, externalDiskAddress* f,
                    externalDiskAddress* t, int I,
20                  int I, BYTE* b);
21  };
```

A request is described by: (1) a request type, one of the values of the enumeration "rType;" (2) a "From" external disk address, indicating, in some cases, the source of the data for the operation or command, such as the LUN to be copied in an INITIAL-COPY I/O device command; (3) a "To" external disk address, indicating the target disk address for the command, such as the copy LUN in an INITIAL-COPY I/O device command; (4) an internal address indicating a particular hard disk drive and hard-disk-drive address within a disk array; (5) a Length, indicating, for certain I/O requests, the length, in sectors, of the requested I/O operation; (6) an ID indicating the source entity that generated the request command; and (7) a pointer to a buffer containing data associated with the request command. The class "request," provided above, contains methods for storing and retrieving the various values that together comprise a generalized I/O request. In many practical implementations, different types of I/O requests, I/O operations, and I/O device commands may be represented by different types of data structures, but, for the sake of simplicity, the data controller pseudocode model uses a single request data structure.

The class "queue," provided below, represents an input or ouput queue that stores requests processed by the disk array controller:

```
1   class queue
2   {
3       public:
4           void insert(request* elem);
5           request* getNext();
6           void attachHandle (void (*a)(queue* qu));
7           queue();
8   };
```

The class "queue" includes methods to insert and retrieve requests from a queue, as well as a method "attachHandle," declared above on line 6, that allows the disk array controller, or another processing entity within a disk array, to associate a call-back function with a queue so that, when a request is inserted into the queue by one processing entity, another processing entity is awakened to process the inserted request.

The class "trackToTracks," represents a data structure that stores information about the correspondence between a block of tracks of a LUN provided by the disk array and a block of tracks contained within an internal hard disk drive.

```
1   class trackToTracks
2   {
3       public:
4           int getLUNtrack ();
5           int getBlockLength ();
6           int getHDD ();
7           int getSide ();
8           int getTrack ();
9           trackToTracks* getNxt ();
10          void setLUNtrack (int lt);
11          void setBlockLength (int bl);
12          void setHDD (int hd);
13          void setSide (int sd);
14          void setTrack (int tk);
15          void setNxt (trackToTracks* tt);
16          trackToTracks (int L, int b, int H, int s, int t,
                           trackToTracks* n);
17  };
```

The correspondence between a LUN and hard disk drives within a disk array is represented by a linked list of trackToTracks objects. In the current model, it is assumed that there is a one-to-one correspondence between LUN tracks and hard-disk-drive tracks or, in other words, it is assumed that a LUN track cannot span multiple hard disk drive tracks. Furthermore, it is assumed that READ and WRITE I/O requests cannot span multiple tracks. A trackToTracks data structure contains a value indicating the starting track of a block of LUN tracks and a value indicating the length of the block of LUN tracks, or, in other words, the number of tracks in the block. The trackToTracks data structure also contains indications of the hard disk drive, the side of the hard disk drive, and starting track of the hard disk drive corresponding to the starting LUN track. A trackToTracks data structure thus represents the correspondence between a block of LUN tracks and a block of tracks within a single hard disk drive.

The class "array_map," provided below, represents the internal mapping between LUNs provided by the disk array and hard disk drives within the disk array, and includes member functions that map I/O requests and I/O device commands directed to LUNs through one or more internal I/O requests directed to hard disk drives:

```
1   class array_map
2   {
3       private:
4           trackToTracks* map[numLUNs];
5           void initialCopy (request *r);
6           void format(request *r);
7           internalDiskAddress* trans(externalDiskAddress* e);
8       public:
9           void mapRequest(request *r);
10          void mapResponse(request *r);
11          array_map();
12  };
```

The private data member "map," declared above on line 4, is an array with an array element for each LUN. The array element points to a linked list of trackToTracks data structures, each linked list of trackToTracks data structures representing the mapping of a LUN onto the hard disk drives within the disk array. The class "array_map" includes private member functions, declared above on lines 5–7, for handling the INITIAL-COPY I/O device commands and FORMAT I/O device commands and for translating external LUN-based disk addresses to internal hard-disk-drive based disk addresses. The class "array_map" includes public member functions, called by the disk array controller, to map I/O requests into hard-disk-drive operations and to map status messages returned by hard disk drives to completion messages returned to external entities, declared above on lines 9–10. These three private member functions and two public member functions will be described, in detail, with full implementations, below.

The class "cache," representing generalized memory cache within the disk array, is provided below:

```
1   class cache
2   {
3       public:
4           BYTE* zeroTrack();
5           BYTE* getCachedBlock(internalDiskAddress* ida, int len);
6           BYTE* getBuf(internalDiskAddress* ida, int len);
7   };
```

The generalized memory cache provides the following member functions: (1) "zeroTrack," which returns a pointer to a track-sized block of zero data values; (2) "getCachedBlock," which looks for a block of data values described by the supplied internal disk address and length arguments within the cache, and, if the block of data values is resident within the cache, returns a pointer to the block, and otherwise returns a null pointer; and (3) "getBuff," a member function which returns a buffer for storage of the data described by the internal disk address and length arguments.

With the above class declarations, a disk array controller, for the purposes of illustrating the present invention, can be described by the following class instantiations and several routines to be described later:

```
1   queue inQueue;
2   queue outQueue;
3   queue HDDinQueues[numHDDs];
4   queue HDDoutQueues[numHDDs];
5   cache mCache;
6   array_map aMap;
```

The queue "inQueue," declared above on line 1, is the input queue from which the disk array controller receives I/O requests and I/O device commands from external entities, such as host computers. The queue "outQueue," declared above on line 2, is the output queue to which the disk array controller queues completed I/O requests, which are then handled by a communications component that returns completion messages and, in some cases, I/O commands, to external entities. Thus, the disk array controller simply processes I/O requests received via the queue "inQueue" and, after processing the I/O requests, returns the I/O requests to the queue "outQueue" for subsequent handling by a communications component. Thus, in the current model, all the communications interfaces are abstracted by a communications component that interfaces to the disk array controller through the queues "inQueue" and "outQueue." The disk array controller carries out I/O requests by queuing I/O commands to input queues for each hard disk drive within the disk array, and by receiving completed I/O commands from the hard disk drives via output queues associated with the hard disk drives. The array of input queues "HDDinQueues," declared above on line 3, includes an input queue for each hard disk drive within the disk array, and the array "HDDoutQueues," declared above on line 4, includes an output queue associated with each hard disk drive within the disk array. The disk array controller employs a generalized memory cache, declared above as "mCache," on line 5, and an instance of the above-described class "array_map," "aMap," declared above on line 6.

The main routine for the disk array controller is provided below:

```
1    main ()
2    {
3        for (int i = 0; i < numHDDs; i++)
4            HDDoutQueues[i].attachHandle(handleHDDs);
5        inQueue.attachHandle(handleIncoming);
6        sleep();
7        return 0;
8    }
```

The disk array controller, on lines 3–4 above, associates each hard-disk-drive output queue with the call-back function "handleHDDs," to be described below. On line 5, the disk array controller associates the input queue "inQueue" with the call-back function "handleIncoming," to be described below. Then, the main routine sleeps, on line 6. Thus, following initialization of the hard-disk-drive outqueues and the input queue, all disk array controller processing is handled through the call-back functions in separate threads or processes launched via the call-back functions.

An implementation of the call-back function "handleIncoming," which is called when an I/O request is queued by the communications component to the input queue, is provided below:

```
1    void handleIncoming(queue* qu)
2    {
3        request* r;
4        request rq;
5        r = qu->getNext();
6        while (r != NULL)
7        {
8            rq = *r;
9            aMap.mapRequest(&rq);
10           r = qu->getNext();
11       }
12   }
```

The call-back function "handleIncoming" dequeues the next request of the input queue on line 5. Then, in the while-loop of lines 6–11, the most recently dequeued request is handled by via the array_map member function "mapRequest," called on line 9, and another request is dequeued from the input queue on line 10. When no further input requests can be dequeued, the call-back function finishes. Note that, depending on the implementation details, multiple instances of the call-back functions may concurrently execute within the disk array.

The call-back function "handleHDDs," which is called when an internal request is completed by a hard disk drive and queued to a hard-disk-drive output queue, is provided below:

```
1    void handleHDDs(queue* qu)
2    {
3        request* r;
4        request rq;
5        r = qu->getNext();
6        while (r != NULL)
7        {
8            rq = *r;
9            aMap.mapResponse(&rq);
10           r = qu->getNext();
11       }
12   }
```

This call-back function is similar to the call-back function "handleIncoming," with the exception that internal requests are dequeued from a hard-disk-drive output queue and are passed to a different member function of the array_map instance "aMap," "mapResponse."

Next, implementations of the array_map member functions are discussed. The array_map member function "trans," which translates an external disk address, supplied as argument "e," to an internal disk address, to which a pointer is returned, is provided below:

```
1    internalDiskAddress* array_map::trans(externalDiskAddress* e)
2    {
3        trackToTracks *t = map[e->getLUN()];
4        int lowTrac = t->getLUNtrack();
5        int highTrac = lowTrac + t->getBlockLength() - 1;
6        while (e->getTrack() < highTrac)
7        {
8            t = t->getNxt();
9            lowTrac = t->getLUNtrack();
10           highTrac = lowTrac + t->getBlockLength() - 1;
11       }
12       internalDiskAddress* intDA =
13           new internalDiskAddress (e->getDiskArray(),
                   e->getTrack() - lowTrac,
14                                   e->getSector(), t->getHDD(),
                                     t->getSide());
15       return intDA;
16   }
```

The translation is straightforward. First, the pointer "t" is initialized to point to the linked list of trackToTracks data structures corresponding to the LUN indicated in the external disk address, on line 3, above. The local variables "lowTrac" and "highTrac" are initialized on lines 4 and 5 to the starting LUN track and ending LUN track of the block of tracks described by the first trackToTracks data structure in the linked list pointed to by local variable "t." Then, in the while-loop on lines 6–11, the member function "trans" checks each trackToTracks data structure in the linked list representing the mapping of a LUN to hard-disk-drive tracks in order to locate the trackToTracks data structure corresponding to the LUN track designated in the external disk address "e." Finally, on lines 12–13, the member function "trans" instantiates a new internalDiskAddress object "intDA" corresponding to the external disk address "e."

The array_map member function "mapRequest," which handles incoming I/O requests for the communications component, is provided below:

```
1    void array_map::mapRequest(request *r)
2    {
3        if (r->getType() == FORMAT)
4        {
```

-continued

```
5           format(r);
6           return;
7       }
8       else if (r->getType() == INIT_COPY)
9       {
10          initialCopy(r);
11          return;
12      }
13      else
14      {
15          BYTE* b = NULL;
16          internalDiskAddress* intDA = trans(r->getTo());
17          intDA->setSector(r->getTo()->getSector());
18          if (r->getType() == READ)
19              b = mCache.getCachedBlock(intDA,
                    r->getLength());
20          if (b != NULL)
21          {
22              r->setBuffer(b);
23              outQueue.insert(r);
24          }
25          else
26          {
27              if (r->getType() == READ)
28                  r->setBuffer(mCache.getBuf(intDA,
                        r->getLength()));
29              r->setInternalAdd(intDA);
30              HDDinQueues[intDA->getHDD()].insert(r);
31          }
32      }
33  }
```

The member function "mapRequest" tracks, on line 3, whether the I/O request "r," supplied as the single argument, is of type FORMAT, and, if so, calls the array_map member function "format" to handle the I/O request on line 5. Otherwise, if the I/O request is an initial-copy request, as detected by mapRequest on line 8, then mapRequest passes the I/O request to the array_map member function "initialCopy," on line 10. Otherwise, in the current model, the I/O request is either a READ request or a WRITE request. Processing of READ and WRITE requests begins on line 15. First, the local variable "b" is set to NULL, on line 15. Next, the target address contained within the request is translated into an internal address "intDA" on lines 16–17. If the I/O request is a READ request, as detected on line 18, then the cache member function "getCachedBlock" is called on line 19 to determine whether the requested data is resident within the cache. If so, as detected on line 20, then a pointer to the cache-resident data is inserted into the I/O request, and the I/O request is queued to the output buffer on line 23 for handling by the communications component, since no internal READ operation needs to be issued. The communications component packages the requested data from the cache into one or more communications packets and returns them to the requester. If the requested data is not resident in cache, mapRequest allocates a cache buffer into which the data can be read, on lines 27–28. in the case that the I/O request is a READ request. Next, mapRequest inserts the internal disk address corresponding to the I/O request into the I/O request on line 29 and, finally, queues the I/O request to the input queue corresponding to the hard disk drive that stores the data to be read or written, on line 30.

The array_map member function "initialCopy," called from the array_map member function "mapRequest," handles processing of an initial copy request that specifies copying of a LUN provided by the disk array to a second LUN in order to create a mirror pair:

```
1   void array_map::initialCopy (request *r)
2   {
3       BYTE* b;
4       externalDiskAddress* iFrom = r->getFrom();
5       externalDiskAddress* iTo = r->getTo();
6       trackToTracks *t = map[iFrom->getLUN()];
7       int trNo = 0;
8       while (t != NULL)
9       {
10          for (int i = 0; i < t->getBlockLength(); i++)
11          {
12              internalDiskAddress* intDA =
13                  new internalDiskAddress (thisArray,
                        t->getTrack() + i, 0,
14                      t->getHDD(),  t->getSide());
15              externalDiskAddress* to = new externalDiskAddress;
16              *to = *iTo;
17              b = mCache.getCachedBlock(intDA, r->getLength());
18              if (b != NULL)
19              {
20                  delete intDA;
21                  r->setBuffer(b);
22                  r->setType(INIT_COPY_WRITE);
23                  if (iTo->getDiskArray() == thisArray)
24                  {
25                      to->setTrack(trNo);
26                      r->setInternalAdd(trans(to));
27                      HDDinQueues[iTo->getLUN()].insert(r);
28                  }
29                  else
30                  {
31                      externalDiskAddress* f = new
                            externalDiskAddress;
32                      *f = *iFrom;
33                      f->setTrack(trNo);
34                      r->setFrom(f);
35                      to->setTrack(trNo);
36                      r->setTo(to);
37                      outQueue.insert(r);
38                  }
39              }
40              else
41              {
42                  externalDiskAddress* f = new
                        externalDiskAddress;
43                  *f = *iFrom;
44                  f->setTrack(trNo);
45                  r->setFrom(f);
46                  to->setTrack(trNo);
47                  r->setTo(to);
48                  r->setBuffer(mCache.getBuf(intDA,
                        r->getLength()));
49                  r->setType(INIT_COPY_READ);
50                  r->setInternalAdd(intDA);
51                  HDDinQueues[intDA->getHDD()].insert(r);
52              }
53              trNo++;
54          }
55          t = t->getNxt();
56      }
57      outQueue.insert(r);
58  }
```

Handling of an initial copy request is a bit more difficult than handling of READ and WRITE commands, because an initial copy request generates a large number of internal I/O requests. First, a local variable "b" is declared on line 3 as a byte pointer. On lines 4–5, local variables "iFrom" and "iTo" are initialized to reference the From and To addresses included within the initial copy request referenced by argument "r." On line 6, the local variable "t" is initialized to point to the linked list of trackToTracks data structures that represent the mapping of the LUN, to which the initial copy request is directed, to hard disk drives within the disk array. On line 7, the local variable "trNo" is initialized to contain the value "0". The local variable "trNo" reoresents the LUN track currently considered by member function "initial-Copy." The while-loop of lines 8–56 traverses the linked list of trackToTracks data structures representing the mapping of the LUN to the hard disk drives within the disk array, using each trackToTracks data structure to find a next block of LUN tracks from the target LUN to copy to the copy LUN. In FIGS. 7 and 11, above, the copy LUN is assumed to be located within the disk array, however, a copy LUN may be located within some other disk array, so that data read from the target LUN may need to be exported from the disk array to an external device. Note that, in the current model, it is assumed that the copy LUN has been designated a sparse LUN prior to the initial copy, and that the copy LUN has been formatted.

The for-loop of lines 10–54 extracts LUN tracks from a trackToTracks data structure, translates each LUN track into an internal address, and processes the track by either launching an internal WRITE request to read the track from an internal hard disk drive or by finding the data already resident in cache. On lines 12–14, the local variable "intDA" is initialized to point to an internal disk address corresponding to the currently considered LUN track. On lines 15–16, a copy of the external address referenced by iTo is made and the local variable "to" is initialized to point to the copy. On line 17, the cache is accessed to determine whether the track currently considered is already cache resident. If so, as detected on line 18, then an internal READ need not be directed to the hard disk drive containing the track, but, instead, the cache-resident data can be immediately sent for writing to the copy LUN. Thus, the internal disk address is deleted on line 20, and the request is updated on lines 21–22 to reference the cache-resident data and to indicate that the request represents an INITIAL-COPY internal WRITE command. If the copy LUN is provided by the disk array, as detected on line 23, then the request is directed to the appropriate internal hard disk drive on lines 25–27. Otherwise, the request is set up for transmission to an external disk array on lines 31–36 and queued to the output queue on line 37. If the track is not cache-resident, then the request is modified to be an internal INITIAL-COPY READ request on lines 42–50, and is queued to the input queue for the appropriate hard disk drive on line 51. Finally, the local variable "trNo" is incremented on line 53. Thus, all tracks of a target LUN are either found in cache or read from the target LUN and directed to the copy LUN.

The array_map member function "format," called from the array_map member function "maprequest," handles a FORMAT I/O device command:

```
1   void array_map::format(request *r)
2   {
3       BYTE* b = mCache.zeroTrack();
4       externalDiskAddress* ext = r->getTo();
5       trackToTracks *t = map[ext->getLUN()];
6       while (t != NULL)
7       {
8           for (int i = 0; i < t->getBlockLength(); i++)
9           {
10              internalDiskAddress* intDA =
11                  new internalDiskAddress (thisArray,
                        t->getTrack() + i, 0,
12                                                       t->getHDD(),     t->getSide());
13              r->setInternalAdd(intDA);
14              r->setBuffer(b);
15              r->setType(FORMAT_WRITE);
16              HDDinQueues[t->getHDD()].insert(r);
17          }
18          t = t->getNxt();
19      }
20      outQueue.insert(r);
21  }
```

On line 3, the local variable "b" is set to refer to a track-sized memory buffer containing zero data values. On line 4, the local variable "ext" is set to refer to the external address for the target LUN. On line 5, the local variable "t" is set to reference the linked list of trackToTracks data structures representing mapping of the target LUN to internal hard disk drives. In the while-loop of lines 6–19, an internal WRITE request is generated to write zero data values to each track of the LUN. The while-loop traverses the linked-list of trackToTracks data structures, and the for-loop of lines 8–19 issues internal WRITE commands for each track mapped by the trackToTracks data structure referenced by local variable "t." On lines 10–12, the local variable "intDA" is initialized to reference an internal disk address corresponding to the currently considered LUN track. On lines 13–15, the request is updated to represent an internal WRITE command, and, on line 16, the updated request is queued to the input queue of the appropriate hard disk drive.

The array_map member function "mapResponse," called from the call-back function "handleHDDs," handles completed internal I/O requests queued by hard disk drives to their output queues:

```
1   void array_map::mapResponse(request *r)
2   {
3       delete r->getInternalAdd();
4       switch (r->getType())
5       {
6           case READ:
7           case WRITE:
8               outQueue.insert(r);
9               break;
10          case FORMAT_WRITE:
11          case INIT_COPY_WRITE:
12              break;
13          case INIT_COPY_READ:
14              r->setType(INIT_COPY_WRITE);
15              if (r->getTo()->getDiskArray() == thisArray)
16              {
17                  r->setInternalAdd(trans(r->getTo()));
18                  HDDinQueues[r->getInternalAdd()->getHDD()].insert(r);
19              }
20              else
21              {
22                  externalDiskAddress* tmp;
23                  tmp = r->getTo();
24                  r->setTo(r->getFrom());
25                  r->setFrom(tmp);
26                  outQueue.insert(r);
27              }
28              break;
29      }
30  }
```

The member function "mapResponse" is straightforward. Completed READ and WRITE I/O requests are queued to the output queue handled by a communications component on line 8. Completed internal WRITE commands generated during format and initial copy I/O device command processing are discarded, on lines 10–12. Completed internal READ commands generated during processing of an initial copy I/O device command are transformed into WRITE requests in order to transfer the data read from the target LUN to the copy LUN. In the case of a copy LUN provided by the disk array, the WRITE requests are internal WRITE requests and are queued to the appropriate hard-disk-drive input queue on line 18. WRITE commands directed to an external copy LUN are queued to the output queue for processing by a communications component on line 26.

Thus, the above pseudocode model describes disk array controller handling of READ and WRITE I/O requests and FORMAT and INITIAL-COPY I/O device commands. The above model corresponds to FIGS. 4–7, discussed above, including no special handling of sparse LUNS to which the I/O requests and I/O device commands can be directed. The model, as pointed out above, omits a great many details unrelated to illustration of the present invention. The present invention is described, below, by noting changes to the above pseudocode model to implement specialized sparse LUN handling as discussed above with reference to FIGS. 8–11.

First, an additional type definition is employed and the class array_map is altered:

```
1   typedef bool* ZTPtr;
2   class array_map
3   {
4       private:
5           trackToTracks* map[numLUNs];
6           ZTPtr sparse[numLUNs];
7           void zero(ZTPtr z);
8           bool allZeroes(BYTE* b);
9           void initialCopy (request *r);
10          void format(request *r);
11          internalDiskAddress* trans(externalDiskAddress* e);
12      public:
13          void mapRequest(request *r);
14          void mapResponse(request *r);
15          array_map();
16  };
```

The type "ZTPtr," declared on line 1 above, is a pointer to a Boolean value, and is used in subsequent code to point to arrays of Boolean values that represent bitmaps, each array representing a bitmap for a particular LUN. In the class "array_map," a new data member "sparse" is added on line 6. This data member is an array of pointers to bitmaps, and those LUNs identified as sparse LUNs have corresponding bitmaps pointed to by entries in the array "sparse." Entries in the array "sparse" for non-sparse LUNs are null pointers. The new member function "zero," declared on line 7, sets a bitmap to all zero, or false, entries, indicating that all tracks of a LUN are null tracks. The member function "allZeroes," declared on line 8, checks a memory buffer or cache buffer to see if it contains all zero data values, and returns a Boolean result indicating whether or not the cache buffer contains only zero values. Thus, the new data member "sparse" represents the stored indications and bitmaps illustrated in FIGS. 8–11 as a portion 802 of internal memory.

The above pseudocode model is provided in order to demonstrate enhancement of an existing disk array controller in order to incorporate techniques of the present invention. As discussed above, the model is not a complete implementation of a disk array controller, nor an optimal implementation of a disk array controller. It is sufficient, however, to illustrate enhancement of a disk array controller according to one embodiment of the present invention. In order to alter the pseudocode model to incorporate the techniques of the present invention, the three array_map member functions "initialCopy," "format," and "mapRequest" need to be slightly altered. The altered version of member function "initialCopy" is provided below:

```
1   void array_map::initialCopy (request *r)
2   {
3       BYTE* b;
4       externalDiskAddress* iFrom = r->getFrom();
5       externalDiskAddress* iTo = r->getTo();
6       trackToTracks *t = map[iFrom->getLUN()];
7       int trNo = -1;
8       ZTPtr z = sparse[iFrom->getLUN()];
9       while (t != NULL)
10      {
11          for (int i = 0; i < t->getBlockLength(); i++)
12          {
13              trNo++;
14              if ((z != NULL) && z[trNo]) continue;
15              internalDiskAddress* intDA =
16                  new internalDiskAddress (thisArray,
                        t->getTrack() + i, 0,
17                                          t->getHDD(),
                                            t->getSide());
18              externalDiskAddress* to = new externalDiskAddress;
19              *to = *iTo;
20              b = mCache.getCachedBlock(intDA, r->getLength());
21              if (b != NULL)
22              {
23                  delete intDA;
24                  r->setBuffer(b);
25                  r->setType(INIT_COPY_WRITE);
26                  if (iTo->getDiskArray() == thisArray)
27                  {
28                      to->setTrack(trNo);
29                      r->setInternalAdd(trans(to));
30                      HDDinQueues[iTo->getLUN()].insert(r);
31                  }
32                  else
33                  {
34                      externalDiskAddress* f = new
                            externalDiskAddress;
35                      *f = *iFrom;
36                      f->setTrack(trNo);
37                      r->setFrom(f);
38                      to->setTrack(trNo);
39                      r->setTo(to);
40                      outQueue.insert(r);
41                  }
42              }
43              else
44              {
45                  externalDiskAddress* f = new
                        externalDiskAddress;
46                  *f = *iFrom;
47                  f->setTrack(trNo);
48                  r->setFrom(f);
49                  to->setTrack(trNo);
50                  r->setTo(to);
51                  r->setBuffer(mCache.getBuf(intDA,
                        r->getLength()));
52                  r->setType(INIT_COPY_READ);
53                  r->setInternalAdd(intDA);
54                  HDDinQueues[intDA->getHDD()].insert(r);
55              }
56          }
57          t = t->getNxt();
58      }
59      outQueue.insert(r);
60  }
```

The differences required to practice the present invention in member function "initialCopy" are described with reference to the above-modified initialCopy code. First, the local variable "trNo" is initialized to the value "−1", on line 7, rather than the value "0". An additional local variable "z" is initialized to point to the bitmap for the target LUN on line 8. The increment of local variable "trNo" is now done on line 13, rather than at the end of the for-loop comprising lines 11–56. On line 14, initial copy determines whether or not the target LUN is a sparse LUN and, if so, whether or not the currently considered track is a null track. If the LUN is a sparse LUN and the currently considered track is a NULL track, then nothing more needs to be done, and the remainder of the for-loop code for the current iteration is short-circuited via the continue statement on line 14. In this fashion, internal READ and internal or external WRITE commands are not generated for null tracks.

Modifications to the array_map member function "format" in order to practice the current invention are included in the following version of member function "format:":

```
1   void array_map::format(request *r)
2   {
3       BYTE* b = mCache.zeroTrack();
4       externalDiskAddress* ext = r->getTo();
5       trackToTracks *t = map[ext->getLUN()];
6       ZTPtr z = sparse[ext->getLUN()];
7       if (z != NULL)
8       {
9           zero(z);
10          setPriority(LOW);
11          outQueue.insert(r);
12      }
13
14      while (t != NULL)
15      {
16          for (int i = 0; i < t->getBlockLength(); i++)
17          {
18              internalDiskAddress* intDA =
19                  new internalDiskAddress (thisArray,
                        t->getTrack() + i, 0,
20                      t->getHDD(),
                        t->getSide());
21              r->setInternalAdd(intDA);
22              r->setBuffer(b);
23              r->setType(FORMAT_WRITE);
24              HDDinQueues[t->getHDD()].insert(r);
25          }
26          t = t->getNxt();
27      }
28      if (z == NULL) outQueue.insert(r);
29  }
```

On line 7, the modified member function "format" checks to see if the target LUN is a sparse LUN. If so, then, on line 9, member function "format" zeroes the bitmap associated with the target LUN, sets the priority of processing to low priority, and queues initial requests to the output queue for immediate processing by the communications component, which returns a FORMAT-successful response back to the requesting host computer. Note that the currently-executing process is launched to handle the FORMAT request, and so can have its priority lowered without effecting processing of other I/O requests. The remainder of the modified member function "format" is unaltered. Thus, by zeroing the bitmap, the modified member function "format" effectively sets all tracks of the target LUN to null. As discussed above, care must be taken to ensure that subsequent non-null WRITE operations are not overwritten by the low-priority formatting process. There are many ways to do this, including storing indications of LUNs currently undergoing formatting, and interrupting the low-priority formatting process to prevent overwrites. For the sake of clarity of description, this detail is not reflected in the pseudocode model, but can be easily and straightforwardly implemented by a skilled I/O device designer.

Finally, a modified version of the array_map member function "mapRequest" is provided below:

```
1   void array_map::mapRequest(request *r)
2   {
3       if (r->getType() == FORMAT)
4       {
5           format(r);
6           return;
7       }
8       else if (r->getType() == INIT_COPY)
9       {
10          initialCopy(r);
11          return;
12      }
13      else
14      {
15          BYTE* b = NULL;
16          internalDiskAddress* intDA = trans(r->getTo());
17          ZTPtr z = sparse[r->getTo()->getLUN()];
18          intDA->setSector(r->getTo()->getSector());
19          if (r->getType() == READ)
20          {
21              if (z != NULL && z[r->getTo()->getTrack()])
22                  b = mCache.zeroTrack();
23              else b = mCache.getCachedBlock(intDA,
                    r->getLength());
24              if (b != NULL)
25              {
26                  delete intDA;
27                  r->setBuffer(b);
28                  outQueue.insert(r);
29              }
30              else
31              {
32                  r->setBuffer(mCache.getBuf(intDA,
                        r->getLength()));
33                  r->setInternalAdd(intDA);
34                  HDDinQueues[intDA->getHDD()].insert(r);
35              }
36          }
37          else // WRITE
38          {
39              if ((z != NULL) && z[r->getTo()->getTrack()] &&
40                  allZeroes(r->getBuffer()))
41              {
42                  delete intDA;
43                  outQueue.insert(r);
44              }
45              else
46              {
47                  if z != NULL&&
48                      !allZeroes(r->getBuffer()))
49                      z[r->getTo()->getTrack()] = false;
50                  r->setInternalAdd(intDA);
51                  HDDinQueues[intDA->getHDD()].insert(r);
52              }
53          }
54      }
55  }
```

On line 17, the local variable "z" is initialized to point to the bitmap for the target LUN of a READ or WRITE I/O request. If the READ request is directed to the null track of a sparse LUN, as determined on line 21, then local variable "b" is set to reference a track-sized memory buffer containing zero data values on line 22. Thus, in the modified mapRequest, no internal READ request is generated for reading the null track of a sparse LUN, just as no general READ request is generated by reading data already cache-resident. In the same fashion, in the case of a WRITE I/O request, if the WRITE I/O request contains only zero data values and is directed to a null track of a sparse LUN, as detected on lines 39–40, then no internal WRITE request is generated. Finally, if a WRITE request containing non-zero data is directed to a sparse LUN, the sparse LUN's bitmap is updated to indicate that the track to which the WRITE request is directed is no longer null, on lines 47–49.

Thus, with the slightly modified array_map member functions and array_map class declaration, unnecessary reading and writing of tracks of zero data values is eliminated, according to the present invention. It is also necessary to alter the I/O device interface to allow system administrators and users to designate LUNs as sparse LUNs, and a means needs to be provided for initializing data structures associated with mirror LUNs of sparse Luns. Such interface and system administration changes are quite dependent on the particularities of a given system, and are straightforwardly implementable in many different ways.

The pseudocode model of a disk controller, employed for describing an embodiment of the present invention above, includes many assumptions and disk-array-component interactions that may differ from one disk array to another and from one disk-array controller implementation to another. The pseudocode model is provided to show, for one example, the modifications necessary to practice the present invention. Similar modifications can be straightforwardly devised for a wide variety of disk array hardware and firmware implementations.

Although the present invention has been described in terms of a particular embodiment, it is not intended that the invention be limited to this embodiment. Modifications within the spirit of the invention will be apparent to those skilled in the art. For example, the present invention may be practiced in any I/O device that provides LUNs based on internal data storage components. Many additional efficiencies can be realized by enhancing data storage components, network protocols, host computer operating systems, and I/O device controllers to eliminate actual transfer of null data, including run-length encoding and other techniques. Many different implementations of the present invention are possible in hardware, firmware, and software. The described embodiment concerned saving null-track information, but different granularities of data can be selected for characterizing as null. For example, in I/O devices that store data without using the concepts of tracks and sectors, a suitably-sized block of data can be selected for describing as null or not-null by a single bit-map element. Even within disk-based I/O devices, different data groupings can be described by a single bit map element, with careful attention paid to the increasing overheads incurred by the I/O device as the granularities is decreased.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. An I/O device controller within an I/O device comprising:
   an interface to a communications component through which the I/O device controller exchanges messages and data with host computers and other remote devices;
   an interface to internal data storage devices; and
   control functionality that
   translates I/O requests and I/O commands received through the interface to the communications component directed to data storage units provided by the I/O device into internal I/O commands, accessing information, maintained in memory within the I/O device, about null data stored within data storage units to avoid generating and to defer internal I/O requests that result in transfer of null data,
   directs the internal I/O commands to the interface to internal data storage devices,
   receives completion messages from the interface to internal data storage devices, and
   returns completion messages to host computers and other remote devices through the interface to the communications component.

2. The I/O device controller of claim 1 wherein the information, maintained in memory within the I/O device, about null data stored within the data storage units includes a stored indication of whether a data storage unit is sparse and, for each sparse data storage unit, a map, each element of the map representing a block of data within the sparse data storage unit.

3. The I/O device controller of claim 2 wherein the map stored for each sparse data storage unit is a bit map, each bit representing whether or not a corresponding block of data within the sparse data storage unit is null.

4. The I/O device controller of claim 2 wherein the I/O device controller controls a disk array having internal disk drive data storage devices.

5. The I/O device controller of claim 4 wherein each map element represents a track within a data storage unit.

6. The I/O device controller of claim 1 wherein the I/O device controller avoids generating internal I/O requests that result in transfer of null data during processing of READ and WRITE requests that direct the I/O device controller to read null data from, and write null data to, portions of an internal data storage unit that contain null data, and during processing of INITIAL-COPY commands that direct the I/O device controller to copy a portion of one internal data storage device to another data storage device.

7. The I/O device controller of claim 1 wherein the I/O device controller immediately processes a FORMAT command directed to a sparse data storage unit by updating information, maintained in memory within the I/O device, to indicate that the sparse internal data storage unit contains only null data, and deferring sending internal I/O requests to an internal data storage device.

8. A method for improving the efficiency of an I/O device controller interfacing to a communications component through which the I/O device controller exchanges messages and data with host computers and other remote devices and interfacing to internal data storage devices, the method comprising:
   storing information in memory within the I/O device controller about sparse data units and locations of null data within sparse data storage units provided by the I/O device;
   receiving an I/O command from the communications component directed to a target data unit;
   accessing the stored information in memory within the I/O device controller about sparse data units and the locations of null data within sparse data storage units to determine that the target data unit is sparse; and
   short-circuiting, when possible according to stored information in memory about the locations of null data within the sparse target data storage unit, processing of the received I/O command to avoid sending internal I/O commands, corresponding to the received I/O command, to an internal data storage device that read null data from the internal data storage device and write null data to the internal data storage device, and to defer sending internal I/O commands that write null data to the internal data storage device.

9. The method of claim 8 wherein storing information in memory within the I/O device controller about sparse data units and locations of null data within sparse data storage units provided by the I/O device further includes:

storing an indication, for each data storage unit, whether or not the data storage unit is sparse; and storing for each sparse data storage unit a map, each element of the map corresponding to a set of data within the sparse data storage unit and indicating whether the set of data contains only null data.

10. The method of claim 9 wherein the map stored for each sparse data storage unit is a bit map, each bit of which corresponds to a set of data within the sparse data storage unit.

11. The method of claim 9 wherein each element of the map stored for each sparse data storage unit corresponds to a track.

12. The method of claim 8 wherein the received I/O command from the communications component directed to the target sparse data unit is a READ I/O request directed to null data within the target sparse data unit.

13. The method of claim 12 further including, after accessing the stored information in memory within the I/O device controller about sparse data units and the locations of null data within sparse data storage units to determine that the target data unit is sparse and that the READ I/O request is directed to null data within the target sparse data unit, returning a completion message to the communications component without directing an internal I/O request to an internal data storage device.

14. The method of claim 8 wherein the received I/O command from the communications component directed to the target sparse data unit is a WRITE I/O request containing null data directed to null data within the target sparse data unit.

15. The method of claim 14 further including, after accessing the stored information in memory within the I/O device controller about sparse data units and the locations of null data within sparse data storage units to determine that the target data unit is sparse, that the WRITE I/O request is directed to null data within the target sparse data unit, and that the received I/O command contains null data, returning a completion message to the communications component without directing an internal I/O request to an internal data storage device.

16. The method of claim 8 wherein the received I/O command from the communications component directed to the target sparse data unit is a FORMAT request.

17. The method of claim 14 further including, after accessing the stored information in memory within the I/O device controller about sparse data units and the locations of null data within sparse data storage units to determine that the target data unit is sparse, immediately returning a completion message to the communications component and directing, at lowered priority, internal I/O requests to one or more internal data storage devices to write null data to the sparse target data unit.

18. The method of claim 8 wherein the received I/O command from the communications component directed to the target sparse data unit is an INITIAL-COPY request.

19. The method of claim 18 further including, after accessing the stored information in memory within the I/O device controller about sparse data units and the locations of null data within sparse data storage units to determine that the target data unit is sparse, directing internal I/O requests to an internal data storage device to read non-null data sets from the target data unit to write to a copy data unit.

* * * * *